United States Patent
Ishihara

(10) Patent No.: US 9,435,982 B2
(45) Date of Patent: Sep. 6, 2016

(54) FOCUS POSITION CHANGING APPARATUS AND CONFOCAL OPTICAL APPARATUS USING THE SAME

(75) Inventor: Mitsuhiro Ishihara, Hamamatsu (JP)

(73) Assignee: TAKAOKA TOKO CO., LTD., Tokyo (JP)

( * ) Notice: Subject to any disclaimer, the term of this patent is extended or adjusted under 35 U.S.C. 154(b) by 557 days.

(21) Appl. No.: 13/610,112

(22) Filed: Sep. 11, 2012

(65) Prior Publication Data

US 2013/0242396 A1    Sep. 19, 2013

(30) Foreign Application Priority Data

Mar. 14, 2012 (JP) ................. 2012-057103

(51) Int. Cl.
G02B 21/24 (2006.01)
G02B 7/16 (2006.01)
G02B 21/00 (2006.01)

(52) U.S. Cl.
CPC .............. *G02B 7/16* (2013.01); *G02B 21/248* (2013.01); *G02B 21/0024* (2013.01)

(58) Field of Classification Search
CPC ...................................... G02B 21/00–21/0096
USPC ......... 359/368–398, 618–640, 577–590, 614
See application file for complete search history.

(56) References Cited

U.S. PATENT DOCUMENTS

2002/0097490 A1* 7/2002 Endo .................... G02B 21/008 359/388
2002/0157385 A1* 10/2002 Nakatani ............ B01D 46/0036 60/295
2008/0057273 A1* 3/2008 Hamamura et al. .......... 428/172
2008/0088919 A1* 4/2008 Hayashi ............... G02B 5/0231 359/385
2010/0208475 A1* 8/2010 Sherman ............... F21S 10/007 362/418

FOREIGN PATENT DOCUMENTS

| JP | 9-5046 | 1/1997 |
| JP | 2001-83426 | 3/2001 |
| JP | 2001-133695 | 5/2001 |
| JP | 2005-10516 | 1/2005 |
| JP | 2009-168964 | 7/2009 |
| WO | 2006/046502 A1 | 5/2006 |

OTHER PUBLICATIONS

English Machine Translation of JP-2009-168964.*
Office Action issued Jan. 6, 2014 in Korean Patent Application No. 10-2012-0118659.
U.S. Appl. No. 13/610,052, filed Sep. 11, 2012, Ishihara.
Japanese Office Action issued in Application No. 2012-057103 on Dec. 1, 2015.

* cited by examiner

*Primary Examiner* — Bumsuk Won
*Assistant Examiner* — Jeffrey Madonna
(74) *Attorney, Agent, or Firm* — Oblon, McClelland, Maier & Neustadt, L.L.P

(57) ABSTRACT

According to one embodiment, a focus position changing apparatus is provided on an optical path of a confocal optical apparatus having a light source and an objective lens and is configured to change a focus position of the objective lens in an optical axis direction of the objective lens. The focus position changing apparatus includes at least a plurality of optical path changing pieces and a rotating plate. Each of the plurality of optical path changing pieces is differ from each other in at least one of a refractive index and a thickness. On the rotating plate, the plurality of optical path changing pieces is arranged along a rotation direction of the rotating plate so as to cross an optical axis of the objective lens. And an anti-reflection layer is formed in a predetermined region on a surface of the rotating plate on a side of the light source.

4 Claims, 5 Drawing Sheets

FOCUS POSITION CHANGING APPARATUS AND CONFOCAL OPTICAL APPARATUS USING THE SAME

CROSS-REFERENCE TO RELATED APPLICATIONS

This application claims the benefit of priority of Japanese Patent Application No. 2012-57103, filed Mar. 14, 2012, the entire contents of which are incorporated herein by reference.

FIELD

Embodiments described herein relate generally to a focus position changing apparatus which is used in a confocal optical system and changes a focus position of an objective lens in an optical axis direction of an objective lens, and relates to the confocal optical apparatus using the focus position changing apparatus.

BACKGROUND

A confocal optical apparatus, which is an optical apparatus using a confocal optical system, is used as a measuring apparatus for measuring a three-dimensional shape of a surface of a measurement object, or is used as a microscope for measuring the surface of a measurement object. When the confocal optical apparatus is used for these purposes, the confocal optical apparatus needs to be focused at each point on the surface of the measurement object. For this reason, in many cases, the confocal optical apparatus is provided with a focus position changing apparatus for changing the focus position of the objective lens.

Conventionally, as a focus position changing apparatus of this type, a focus position changing apparatus is disclosed in JP-A 9-126739.

The focus position changing apparatus disclosed in JP-A 9-126739 includes a plurality of parallel plate-shaped transparent bodies which are provided in a confocal optical system and different from each other in one of the thickness and the refractive index, and also includes a rotating body on which the plurality of transparent bodies are arranged. The focus position changing apparatus is configured to be able to change the focus position of the objective lens in the optical axis direction (height direction of the measurement object) according to the thickness or the refractive index of the transparent bodies. The transparent bodies are successively made to cross the optical axis in association with the rotation of the rotating body. For this reason, with the focus position changing apparatus using the rotating body of this type, the focus position of the objective lens can be changed precisely and at very high speed as compared with the case where the focus position of the objective lens is fixed and the mounting base of the measurement object is moved.

However, when the focus position changing apparatus using the rotating body is used, the period in which the rotating body itself crosses the optical axis occurs. When the rotating body itself crosses the optical axis, a light beam is reflected by the rotating body. The light beam reflected by the rotating body is originally unnecessary for the confocal imaging system using the light beams reflected by the measurement object, and hence it is desirable to reduce the light beam reflected by the rotating body.

On the other hand, it is preferred that the surface of the rotating body, on which surface the transparent bodies are installed, is formed to have high flatness by polishing or the like of the surface in order to prevent a deviation of the focus position of the objective lens due to an inclination of the transparent body. However, when the flatness of the surface of the rotating body is high, the reflectance of the surface becomes very high. The high reflectance causes increase the amount of light beams which are reflected by the rotating body and inputted into the confocal imaging system.

SUMMARY

The present invention has been made in light of the above situation, and accordingly it is an object of the present invention to provide a focus position changing apparatus which can suppress the light beam from being reflected by the rotating body, and to provide a confocal optical apparatus using the focus position changing apparatus.

To solve the above-described issues, a focus position changing apparatus according to an aspect of the present invention is a focus position changing apparatus provided on an optical path of a confocal optical apparatus having a light source and an objective lens and configured to change a focus position of the objective lens in an optical axis direction of the objective lens. The focus position changing apparatus includes a plurality of optical path changing pieces, a rotating plate and a driving unit. Each of the plurality of optical path changing pieces is formed of a parallel plate-shaped transparent body and is differ from each other in at least one of a refractive index and a thickness. On the rotating plate, the plurality of optical path changing pieces is arranged along a rotation direction of the rotating plate so as to cross an optical axis of the objective lens. And an anti-reflection layer is formed in a predetermined region on a surface of the rotating plate on a side of the light source. The driving unit rotates the rotating plate.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Hereinbelow, a description will be given of a focus position changing apparatus and a confocal optical apparatus using the focus position changing apparatus according to embodiments of the present invention with reference to the drawings.

A confocal optical apparatus provided with a focus position changing apparatus according to an embodiment of the present invention is used as a measuring device for measuring a three-dimensional shape of the surface of a measurement object by using a confocal optical system having a two-dimensional arrangement type confocal aperture array or a Nipkow disk, or is used as a microscope for observing the surface shape of a measurement object. Examples of the measurement object include an electrode terminal (having a size of, for example, several ten to several hundred microns) of a component, such as an IC package, produced in mass production.

First Embodiment

Figure 1:
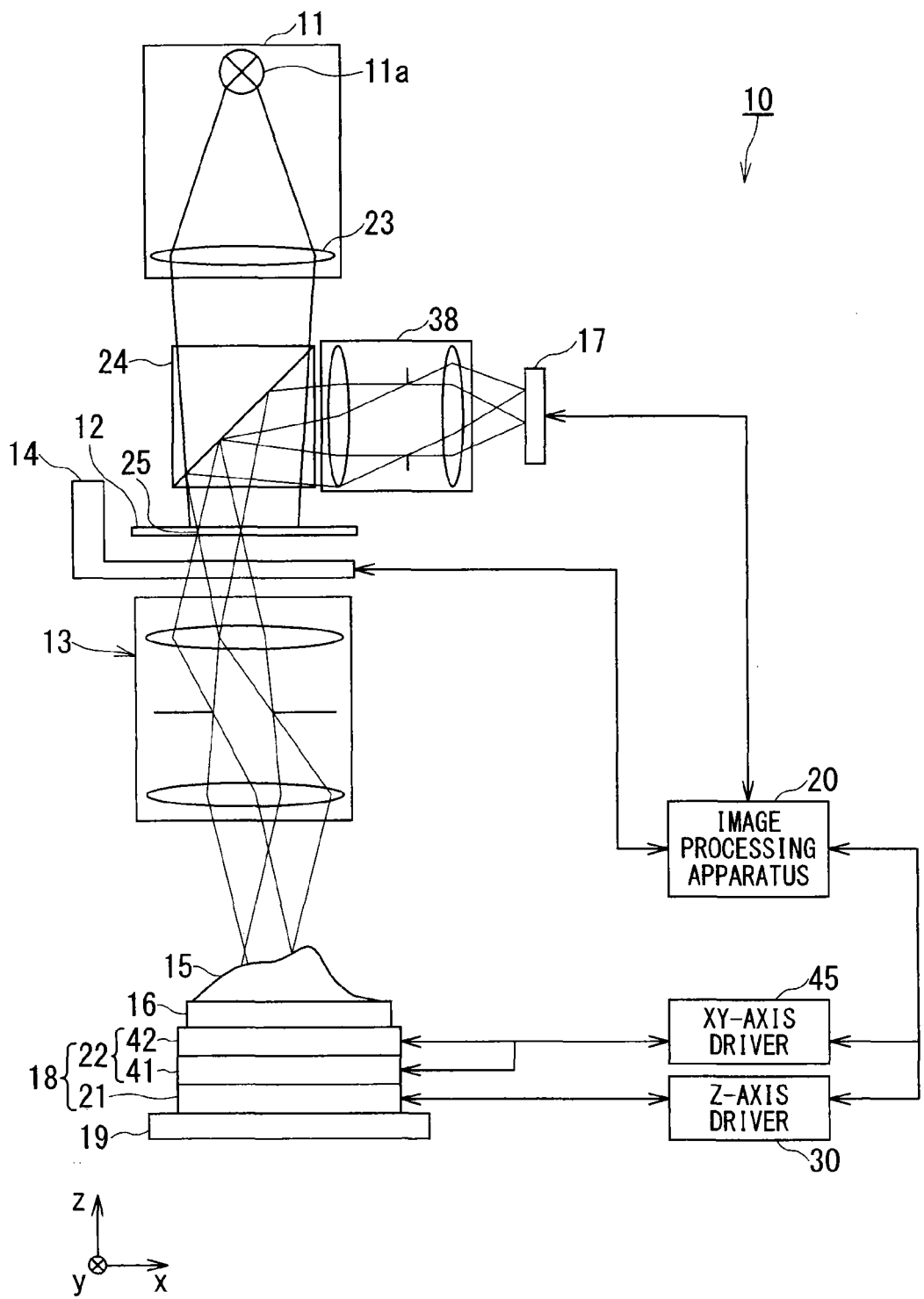
FIG. 1 is a schematic overall view showing a configuration example of a confocal optical apparatus provided with a focus position changing apparatus according to a first embodiment of the present invention.

FIG. 1 is a schematic overall view showing a configuration example of a confocal optical apparatus provided with a focus position changing apparatus according to a first embodiment of the present invention. Note that, in the following description, the case where the optical axis direction is set to the Z-axis direction and where the directions perpendicular to the optical axis direction are set to the X-axis direction and the Y-axis direction is described as an example. Further, in the following description, an example of the case where the confocal optical apparatus provided with the focus position changing apparatus is used as a measuring device for measuring a three-dimensional shape of the surface of a measurement object is described.

The confocal optical apparatus 10 includes an illumination optical system 11 having a light source 11a, an aperture plate 12 arranged so that the main surface thereof is perpendicular to the optical axis direction of the illumination optical system 11, an objective lens 13, a focus position changing portion 14, a mount base 16 for mounting thereon a measurement object 15, a photo-detector group 17 having a plurality of photo-detectors 17a receiving light beams reflected by the measurement object 15, a mount base driving portion 18 for moving the mount base 16 in each of the XYZ directions, a support base 19 for supporting the mount base 16 and the mount base driving portion 18, and an image processing apparatus 20. The mount base driving portion 18 includes a mount base Z displacement portion 21 and a mount base XY displacement portion 22.

As the light source 11a, for example, a halogen lamp, laser, and the like, can be used. The light emitted from the light source 11a is formed into a planar illumination luminous flux via an illumination lens 23. This light illuminates the aperture plate 12 via a polarizing beam splitter 24.

The aperture plate 12 includes a plurality of apertures 25 which function as confocal apertures, respectively. It is only necessary that a plurality of the apertures 25 is formed in the aperture plate 12. As the aperture plate 12, an aperture plate, in which the apertures 25 are two-dimensionally arranged to form an aperture array, may be used, or a so-called Nipkow disk may also be used. When a Nipkow disk is used, the Nipkow disk is rotatably driven by a drive mechanism (not shown).

A light beam having passed through each of the apertures 25 is irradiated onto the objective lens 13 via the focus position changing portion 14. The light beam is then irradiated by the objective lens 13 onto the measurement object 15 so as to be converged at a spot (object side converging point) conjugate with the aperture 25. Each of the object side converging points is located on the surface (hereinafter referred to as object side converging surface) which is formed at a predetermined position in the Z-axis direction so as to be perpendicular to the optical axis direction. Note that the objective lens 13 may be configured by a plurality of lenses and diaphragms, so as to form, for example, a both-side telecentric optical system.

The mount base Z displacement portion 21 is configured by a common drive device, such as a stepping motor, a servo motor or a piezo motor, and displaces the mount base 16 in the optical axis direction. The amount, the direction, and the timing of the displacement are controlled by the image processing apparatus 20 via a Z-axis driver 30. The mount base Z displacement portion 21 roughly displaces the mount base 16 in the optical axis direction, for example, before the start of measurement.

Figure 2:
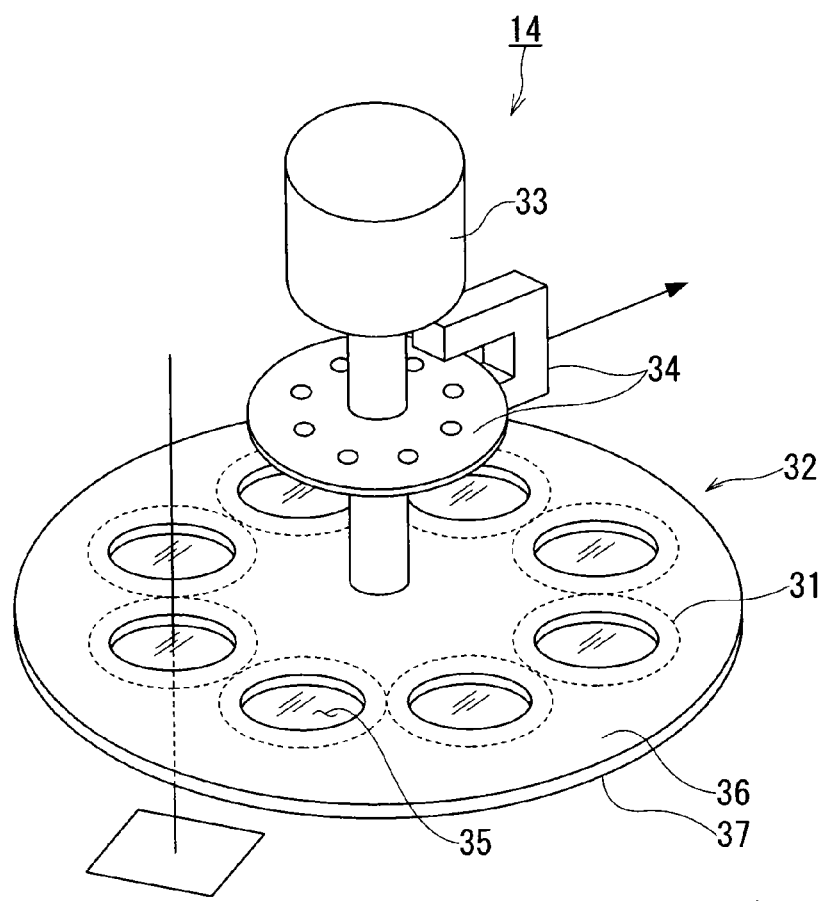
FIG. 2 is a perspective view showing a configuration example of the focus position changing portion.

FIG. 2 is a perspective view showing a configuration example of the focus position changing portion 14. FIG. 2 shows an example of the case where optical path changing pieces 31 are provided on the surface on the side of the measurement object.

When each of the optical path changing pieces 31, each of which is configured by a parallel plate-shaped transparent body, is arranged in the optical path of the objective lens 13, the position of the object side converging surface of the objective lens 13 is moved in the Z direction. The range of the movement of the focal point can be controlled by the refractive index and the thickness of the optical path changing piece 31.

For this reason, as shown in FIG. 2, the optical path changing pieces 31, each of which has a different range of movement of the focal point, are arranged on a rotating plate 32 at regular intervals along the rotation direction of the rotating plate 32. When the rotating plate 32 is continuously rotated at a predetermined speed by a driving portion 33, such as a motor, the position of the object side converging surface of the objective lens 13 can be moved discretely (stepwise) in the Z direction (optical axis direction) each time each of the optical path changing pieces 31 crosses the optical axis of the objective lens 13. Note that each of some of the optical path changing pieces 31 arranged on the rotating plate 32 may have the same refractive index and thickness and the same range of movement of the focal point.

The rotating state of the rotating plate 32 is detected by a timing sensor 34. The output of the timing sensor 34 is transmitted to the image processing apparatus 20. The information, which associates each of the optical path changing pieces 31 with the Z-axis coordinate of the object side converging point, is stored beforehand in the image processing apparatus 20. When, based on the output of the timing sensor 34, the image processing apparatus 20 repeats the exposure of the photo-detector group 17 at the timing at which each of the optical path changing pieces 31 crosses the optical axis, the imaging can be performed easily and at high speed at each position of the plurality of discrete object side converging points.

In addition, the driving portion 33 may also be configured to be controllable by the image processing apparatus 20. In this case, the image processing apparatus 20 can control the rotation speed of the rotating plate 32.

Note that FIG. 2 shows an example of the case where a plurality of light beam passing portions 35 respectively corresponding to the plurality of optical path changing pieces 31 are formed as through openings in the rotating plate 32, where the optical path changing piece 31 is provided on a surface (hereinafter referred to as the measurement object side surface) 37 of the rotating plate 32 on the side opposite to the light source 11a, and where the optical path changing piece 31 is not provided on a surface 36 of the rotating plate 32 on the side of the light source (hereinafter referred to as light source side surface). In this case, a light beam having passed through the aperture 25 passes through the light beam passing portion 35 as the through opening and then passes through the optical path changing piece 31 toward the measurement object 15.

Further, in the following description, an example of the case where the light beam passing portion 35 and the optical path changing piece 31 have a circular shape is described, but the shape of the light beam passing portion 35 and of the optical path changing piece 31 may be an elliptical shape, a polygonal shape, and the like.

Among the light beams reflected by the measurement object 15, particularly the light beam reflected at the object side converging point is converged by the objective lens 13 at the point (hereinafter referred to as image side converging point) having an optically conjugate relationship with the object side converging point. The aperture 25 serving as a point light source corresponds to the object side converging point one to one. In the present embodiment, an example of the case where the image side converging point coincides with the aperture 25 serving as a point light source is described. In this case, the light beam having passed through the aperture 25 is converged at the object side converging point, and is reflected at the object side converging point, so as to again enter the aperture 25.

The light beam having again entered the aperture 25 is deflected by the polarizing beam splitter 24, so as to enter an imaging optical system 38 and to enter the photo-detector 17a forming the photo-detector group 17. Here, the imaging optical system 38 is configured so that an image at the aperture 25 is formed on the photoelectric conversion surface of the photo-detector group 17. The aperture 25 (image side converging point) and the photo-detector 17a arranged at the position corresponding to the aperture 25 are set in an optically conjugate relationship with each other by the polarizing beam splitter 24 and the imaging optical system 38.

The photo-detector group 17 is a so-called two-dimensional image sensor. The photo-detector 17a configuring the photo-detector group 17 is configured by a CCD (Charge Coupled Device) image sensor or a CMOS (Complementary Metal Oxide Semiconductor) image sensor. The photo-detector 17a outputs to the image processing apparatus 20 a signal corresponding to the intensity of an irradiated light beam. Further, the timing of photo-detection by the photo-detector group 17 is controlled by the image processing apparatus 20.

The image processing apparatus 20, which has received the signals outputted from the photo-detector group 17, can use the received signals as image data (hereinafter referred to as confocal image data) for generating an image (hereinafter referred to as confocal image). Further, the image processing apparatus 20 may generate, for example, for each exposure, the confocal image based on the confocal image data. Note that, when the image processing apparatus 20 can obtain output signals of the photo-detector group 17 for each exposure of the photo-detector group 17, the image processing apparatus 20 can perform three-dimensional shape measurement based on the output signals, and hence need not necessarily generate the confocal image.

The image processing apparatus 20 can be configured by an information processing apparatus, such as a common personal computer, having an arithmetic processing portion, such as a CPU, a storage portion which can be read and written by the arithmetic processing portion, an input portion, a display portion, and the like. The arithmetic processing portion of the image processing apparatus 20 performs at least arithmetic processing necessary for the three-dimensional shape measurement, and over-all control of the operation of the confocal optical apparatus 10.

The mount base XY displacement portion 22 of the mount base driving portion 18 displaces the mount base 16 in the direction perpendicular to the optical axis direction. For example, the mount base XY displacement portion 22 is used for moving the measurement target region in the XY surface in each interval between the measurements.

The mount base XY displacement portion 22 includes an X-axis displacement mechanism 41 and a Y-axis displacement mechanism 42 which respectively perform the positioning of the mount base 16 in the X-axis direction and the Y-axis direction. Each of the X-axis displacement mechanism 41 and the Y-axis displacement mechanism 42 is configured, for example, by a servo motor, and the amount, the direction, and the timing of displacement of each of the X-axis displacement mechanism 41 and the Y-axis displacement mechanism 42 are controlled by the image processing apparatus 20 via an XY-axis driver 45.

Next, a configuration of the focus position changing portion 14 is described in detail.

Figure 3:
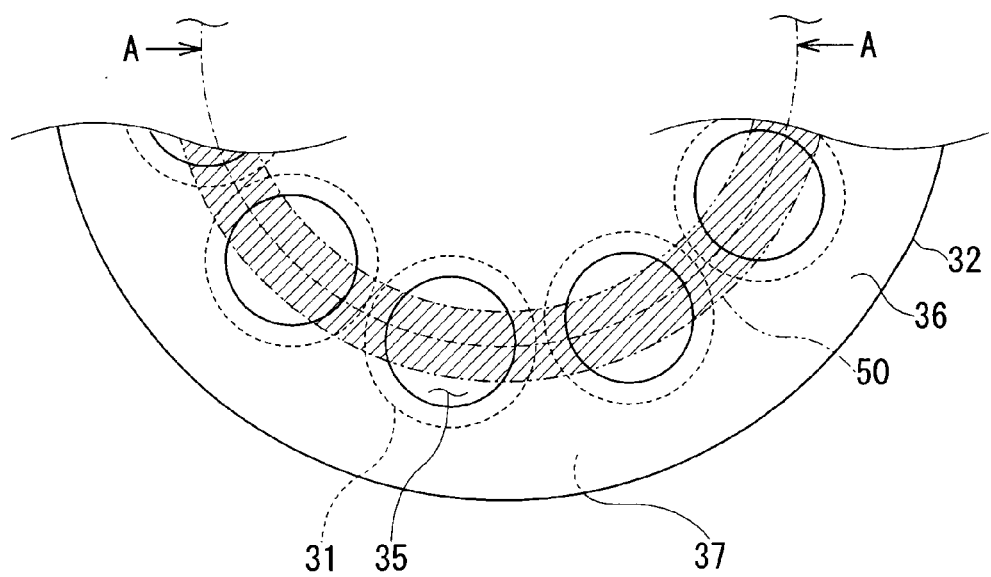
FIG. 3 is a plan view showing a configuration example of a part of the rotating plate in case where the optical path changing piece is provided on the measurement object side surface.

FIG. 3 is a plan view showing a configuration example of a part of the rotating plate 32 in case where the optical path changing piece 31 is provided on the measurement object side surface 37.

According to the rotation of the rotating plate 32, the light beams of the light source 11a are irradiated onto a stripe-shaped region (hereinafter referred to as photo-irradiation region) 50 on the light source side surface 36. However, the region of the rotating plate 32, through which region the light beams are to be made to pass toward the measurement object 15, is only the light beam passing portion 35. For example, when the rotating plate 32 is formed of a high reflectance member, such as a metal member, and when the light beam passing portion 35 is configured by a through opening, no reflection occurs in the light beam passing portion 35. But there is a case where light beams irradiated onto the region, which is the region of the light source side surface 36 of the rotating plate 32, and which belongs to the photo-irradiation region 50 except the light beam passing portion 35, are reflected to the light source side, so as to enter the photo-detector group 17.

Here, in order to prevent the lateral deviation of images due to the inclination of the optical path changing pieces 31, the surface of the rotating plate 32, on which surface the optical path changing pieces 31 are installed, is formed to have high flatness and hence has very high reflectance by being subjected to polishing, and the like. For this reason, when the installation surface of the optical path changing piece 31 is set as the light source side surface 36 of the rotating plate 32, the amount of the light beams, which are reflected by the light source side surface 36 so as to enter the photo-detector group 17, is significantly increased.

To cope with this, the focus position changing portion 14 according to the present embodiment is configured such that the optical path changing pieces 31 are installed on the measurement object side surface 37 so as to enable the amount of the light beams reflected by the light source side surface 36 to be suppressed.

Figure 4:
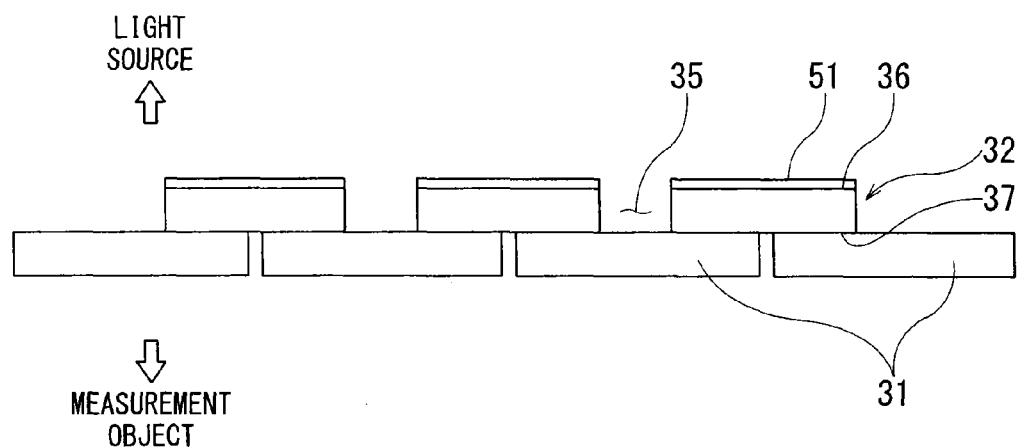
FIG. 4 is an arc-shaped sectional view which shows a part of a configuration example of the focus position changing portion, and which is taken along the line A-A in FIG. 3 and seen from the outer peripheral side.

FIG. 4 is an arc-shaped sectional view which shows a part of a configuration example of the focus position changing portion 14, and which is taken along the line A-A in FIG. 3 and seen from the outer peripheral side.

In the configuration example of the focus position changing portion 14 shown in FIG. 4, the light beam passing portion 35 is configured by a through opening. Further, the optical path changing piece 31 is provided on the measurement object side surface 37 of the rotating plate 32 and at the position corresponding to the light beam passing portion 35. In this case, the measurement object side surface 37 is formed to have high flatness by being subjected to polishing, and the like, beforehand. On the other hand, an anti-reflection layer 51 is formed at least in a region which is the region of the light source side surface 36 except the light beam passing portion 35, and which belongs to the photo-irradiation region 50.

The anti-reflection layer 51 can be formed by one of an anti-reflection material affixed to the rotating plate 32, a black color-type paint applied to the rotating plate 32, and a layer formed by roughening the surface of the rotating plate 32, or can be formed by a combination of these.

With the focus position changing portion 14 according to the first configuration example, the reflection of the light beams irradiated onto the light source side surface 36 can be suppressed by the anti-reflection layer 51.

Figure 5:
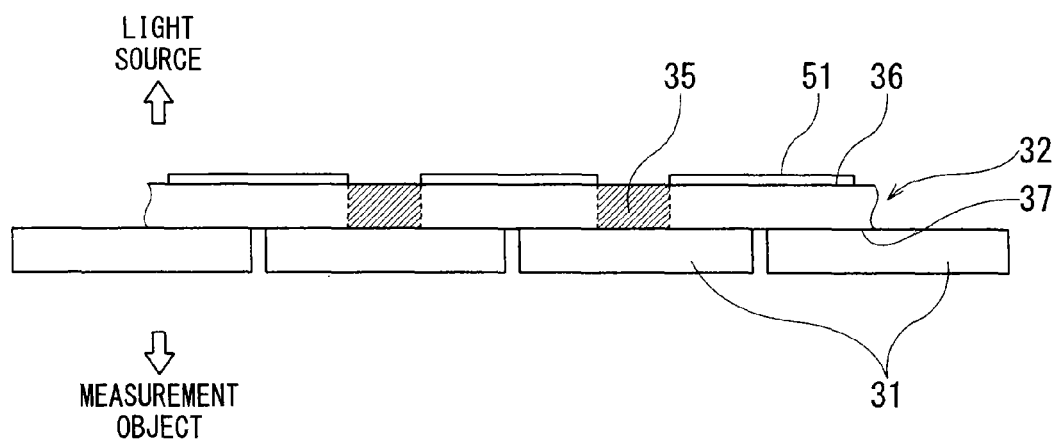
FIG. 5 is a view showing a modification of the rotating plate in the configuration example of the focus position changing portion shown in FIG. 4.

FIG. 5 is a view showing a modification of the rotating plate 32 in the configuration example of the focus position changing portion 14 shown in FIG. 4.

The rotating plate 32 may be configured by a high reflectance member, such as a metal plate, and may also be configured by a transparent body. When the rotating plate 32 is configured by a transparent body, the transparent body can be used as it is as the light beam passing portion 35, and hence it is not necessary to form a through opening as the light beam passing portion 35. That is, when the rotating plate 32 is configured by a transparent body, the rotating plate 32 as a whole can be configured as one continuous plate including the light beam passing portion 35.

When the rotating plate 32 is configured by a transparent body so as to be formed as one continuous plate whose region of the light beam passing portion 35 (hatched portion in FIG. 5) is left as it is without forming the through opening, it is only necessary that the rotating plate 32 in the configuration example shown in FIG. 4 is replaced by the rotating plate 32 according to the modification. FIG. 5 shows an example of the case where the rotating plate 32 in the configuration example of the focus position changing portion 14 shown in FIG. 4 is replaced by the rotating plate 32 according to the modification.

With the focus position changing portion 14 and the confocal optical apparatus 10 according to the present embodiment, the light beams reflected by the light source side surface 36 of the rotating plate 32 can be suppressed in the state where the surface of the rotating plate 32, on which surface the optical path changing piece 31 is installed, is formed to have high flatness by being subjected to polishing, and the like, so as to prevent unintended inclination of the optical path changing piece 31. Therefore, with the confocal optical apparatus 10 using the focus position changing portion 14 according to the present embodiment, it is possible to control the focus position at high speed and minutely in the optical axis direction, and also it is possible to acquire an image in which the influence of light beams reflected by the light source side surface 36 is reduced.

Second Embodiment

Next, the focus position changing apparatus according to the present invention and a second embodiment of a confocal optical apparatus using the focus position changing apparatus are described.

Figure 6:
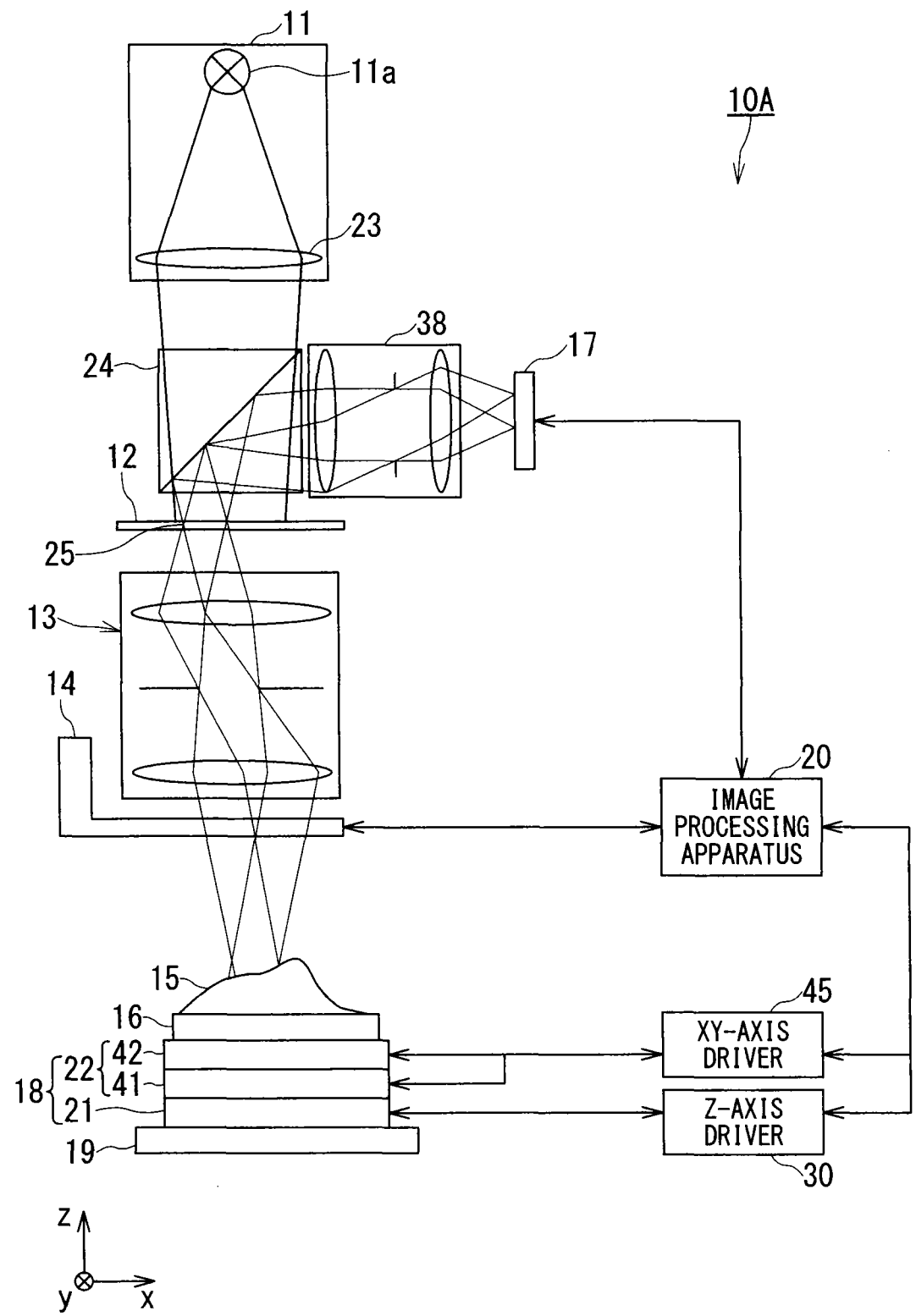
FIG. 6 is a schematic overall view showing a configuration example of a confocal optical apparatus (including the focus position changing portion) according to a second embodiment of the present invention.

FIG. 6 is a schematic overall view showing a configuration example of a confocal optical apparatus 10A (including the focus position changing portion 14) according to a second embodiment of the present invention.

The confocal optical apparatus 10A shown as the second embodiment is different from the confocal optical apparatus 10 shown as the first embodiment in that the focus position changing portion 14 is provided on the side of the measurement object 15 with respect to the objective lens 13. Since the other configurations and operations of the confocal optical apparatus 10A are not substantially different from those of the confocal optical apparatus 10 shown in FIG. 1, the same components and configurations are denoted by the same reference numerals and characters, and their explanation is omitted.

As shown in FIG. 6, the focus position changing portion 14 may be provided on the side of the measurement object 15. Also with the confocal optical apparatus 10A, the same operating effects as those of the confocal optical apparatus 10 according to the first embodiment can be obtained.

Third Embodiment

Next, the focus position changing apparatus according to the present invention and a third embodiment of a confocal optical apparatus using the focus position changing apparatus are described.

Figure 7:
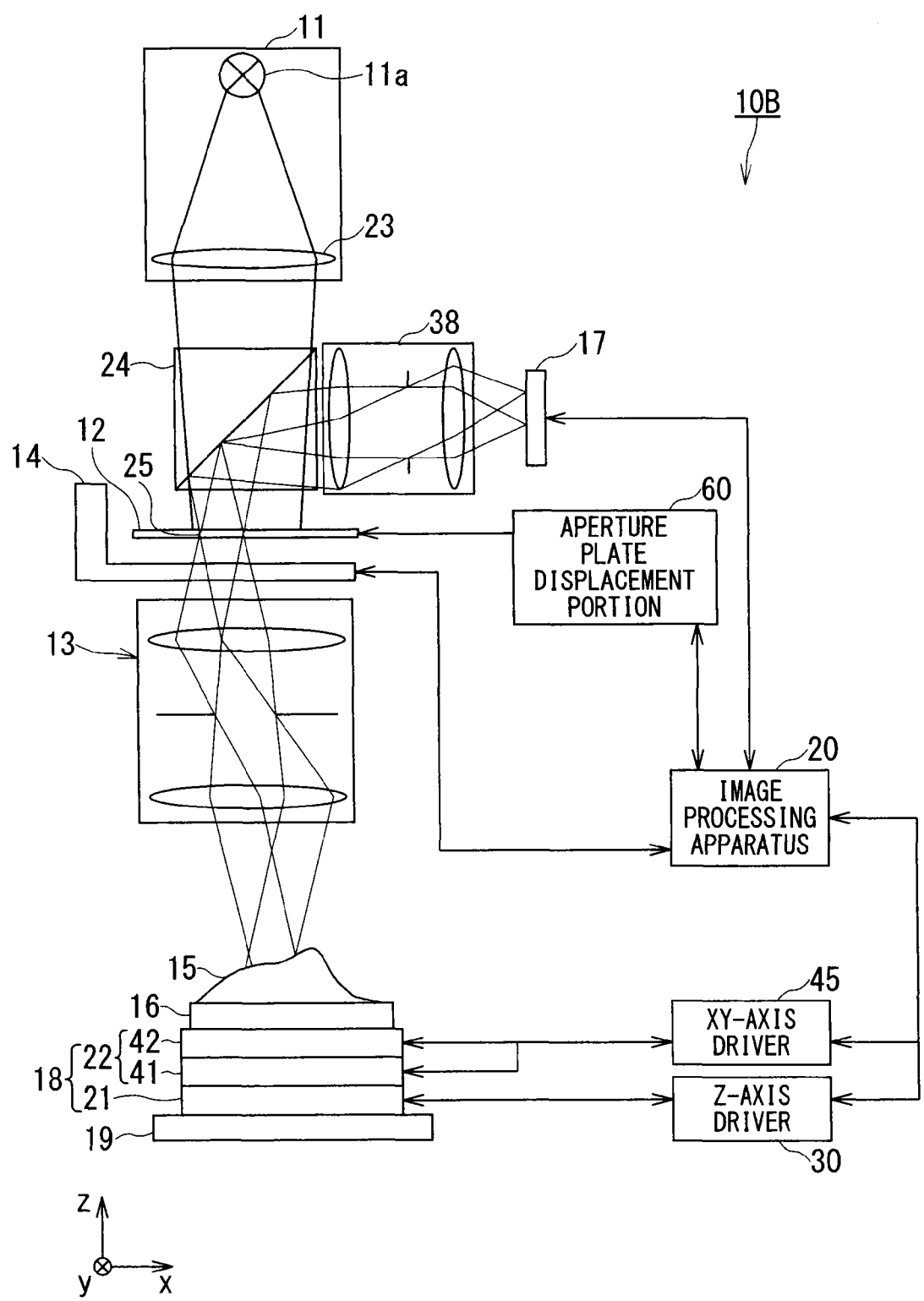
FIG. 7 is a schematic overall view showing a configuration example of a confocal optical apparatus (including the focus position changing portion) according to a third embodiment of the present invention.

FIG. 7 is a schematic overall view showing a configuration example of a confocal optical apparatus 10B (including the focus position changing portion 14) according to a third embodiment of the present invention.

The confocal optical apparatus 10B shown as the third embodiment is different from the confocal optical apparatus 10 shown as the first embodiment in that an aperture plate, in which the apertures 25 are two dimensionally arranged so as to form an aperture array, is used as the aperture plate 12, and in that the aperture plate 12 is linearly displaced by an aperture plate displacement portion 60 in a predetermined direction perpendicular to the optical axis direction. Since the other configurations and operations of the confocal optical apparatus 10B are not substantially different from those of the confocal optical apparatus 10 shown in FIG. 1, the same components and configurations are denoted by the same reference numerals and characters, and their explanation is omitted.

Generally, in order to reduce crosstalk between the light beams, it is necessary that the apertures 25 of the aperture array of the two dimensional arrangement type are provided so as to be separated from each other by a predetermined separation distance. For this reason, in the confocal optical system having the aperture array of the two dimensional arrangement type, the resolution in the in-plane direction perpendicular to the optical axis is restricted by this separation distance. On the other hand, in recent years, as for the two-dimensional image sensor using a solid-state imaging element, an image sensor having a very large number of pixels has been developed.

To cope with this, in the present embodiment, one aperture 25 is made to correspond to a plurality of pixels in such a manner that the aperture plate 12 is linearly scanned by the aperture plate displacement portion 60 in a predetermined direction perpendicular to the optical axis direction in the state where the photo-detector group 17 is exposed.

Also with the confocal optical apparatus 10B, the same operating effects as those of the confocal optical apparatus 10 according to the first embodiment can be obtained. Further, with the confocal optical apparatus 10B according to the present embodiment, it is possible to further improve the resolution of a captured image in the in-plane direction perpendicular to the optical axis.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A focus position changing apparatus provided on an optical path of a confocal optical apparatus having a light source and an objective lens and configured to change a focus position of the objective lens in an optical axis direction of the objective lens, the focus position changing apparatus comprising:
   a plurality of optical path changing pieces, each formed of a parallel plate-shaped transparent body and configured to differ from each other in at least one of a refractive index and a thickness;
   a rotating plate, on which the plurality of optical path changing pieces are arranged along a rotation direction of the rotating plate so as to cross an optical axis of the objective lens, configured to have an anti-reflection layer formed in a predetermined region on a first surface of the rotating plate on a side of the light source; and
   a driving unit configured to rotate the rotating plate,
   wherein the rotating plate includes a plurality of light beam passing portions configured to respectively correspond to the plurality of optical path changing pieces,
   wherein each of the plurality of optical path changing pieces is provided at a position which is located on a second surface of the rotating plate opposite to the side of the light source and which corresponds to each of the plurality of light beam passing portions,
   wherein the second surface, on which the plurality of optical path changing pieces is provided, is formed to have high flatness and have high reflectance such that unintended inclination of the plurality of optical path changing pieces is prevented,
   wherein the predetermined region is a region on the first surface, and is a region at least including a region to be irradiated with a light beam of the light source except regions the plurality of the light beam passing portions are provided, and
   wherein a focus position of the objective lens in the optical axis direction is discretely changed each time the optical path changing piece crossing the optical axis is changed by rotation of the rotating plate.

2. The focus position changing apparatus according to claim 1, wherein
   the rotating plate is provided on the optical path between the light source and the objective lens so as to allow the plurality of optical path changing pieces to cross the optical axis of the objective lens on the side of the light source.

3. The focus position changing apparatus according to claim 1, wherein
   the anti-reflection layer is formed by any one of an anti-reflection material affixed to the rotating plate, a black color-type paint applied to the rotating plate, and a layer formed by roughening the surface of the rotating plate.

4. A confocal optical apparatus comprising:
   a light source;
   an aperture plate in which a plurality of confocal apertures are formed;
   an objective lens configured to converge each of light beams having passed through the plurality of confocal apertures, at an object side converging point, and to again converge each of reflected light beams formed by reflection of converged light beams at a measurement object, at each of the confocal apertures respectively corresponding to object side converging points;
   a focus position changing unit configured to include a plurality of optical path changing pieces which are each formed of a parallel plate-shaped transparent body and which differ from each other at least in one of a refractive index and a thickness, a rotating plate on which the plurality of optical path changing pieces are arranged along a rotation direction of the rotating plate so as to cross an optical axis of the objective lens, the rotating plate having an anti-reflection layer formed in a predetermined region on a first surface of the rotating plate on a side of the light source, and a driving unit configured to rotate the rotating plate, the focus position changing unit being configured to discretely change a focus position of the objective lens in an optical axis direction each time the optical path changing piece crossing the optical axis is changed by rotation of the rotating plate; and
   an imaging system configured to receive a light beam that is reflected by the measurement object and again converged at the confocal aperture,
   wherein the rotating plate includes a plurality of light beam passing portions configured to respectively correspond to the plurality of optical path changing pieces,
   wherein each of the plurality of optical path changing pieces is provided at a position which is located on a second surface of the rotating plate opposite to the side of the light source and which corresponds to each of the plurality of light beam passing portions,
   wherein the second surface, on which the plurality of optical path changing pieces is provided, is formed flat such that unintended inclination of the plurality of optical path changing pieces is prevented, and
   wherein the predetermined region is a region on the first surface, and is a region at least including a region to be irradiated with a light beam of the light source except regions the plurality of the light beam passing portions are provided.

* * * * *